US012688064B2

(12) United States Patent
Ignatowicz et al.

(10) Patent No.: US 12,688,064 B2
(45) Date of Patent: Jul. 21, 2026

(54) DYNAMIC GENERATION OF LOCAL SPECIFICATION DEFINITIONS FOR COMPOSITION OF WORKFLOW MICROSERVICES

(71) Applicant: Red Hat, Inc., Raleigh, NC (US)

(72) Inventors: Eder Ignatowicz, Ayer, MA (US); Ricardo Zanini Fernandes, São Paulo (BR); Thiago Lugli Gonçales, Campinas (BR)

(73) Assignee: Red Hat, LLC, Raleigh, NC (US)

( * ) Notice: Subject to any disclaimer, the term of this patent is extended or adjusted under 35 U.S.C. 154(b) by 567 days.

(21) Appl. No.: 18/193,160

(22) Filed: Mar. 30, 2023

(65) Prior Publication Data

US 2024/0330044 A1     Oct. 3, 2024

(51) Int. Cl.
*G06F 9/48* (2006.01)
(52) U.S. Cl.
CPC .................................. *G06F 9/4881* (2013.01)
(58) Field of Classification Search
CPC ................. G06F 9/4881; G06F 9/5072; G06F 2209/5015
See application file for complete search history.

(56) References Cited

U.S. PATENT DOCUMENTS

| | | | | |
|---|---|---|---|---|
| 10,698,733 | B1 * | 6/2020 | Lee ..................... | G06F 9/44505 |
| 11,444,852 | B2 * | 9/2022 | Bhatia ..................... | H04L 63/08 |
| 2020/0004847 | A1 * | 1/2020 | Bagga ................... | H04L 67/567 |
| 2021/0124576 | A1 * | 4/2021 | Gungabeesoon ......... | G06F 8/38 |
| 2023/0132531 | A1 * | 5/2023 | Chandler .................. | G06F 8/61 |
| | | | | 717/101 |
| 2023/0222419 | A1 * | 7/2023 | Parmar .................. | G06Q 40/02 |
| | | | | 705/7.27 |

FOREIGN PATENT DOCUMENTS

| | | |
|---|---|---|
| CN | 115242761 A | 10/2022 |

OTHER PUBLICATIONS

Jaganathan, "Kogito Serverless Workflow Github Extension Released!," Kie Community, Jul. 18, 2022, 6 pages. https://blog.kie.org/2022/07/new-github-extension-released.html.
Sampada, "validate POST data from swagger json.schema in node," node.js, Jun. 6, 2016, 1 page. https://stackoverflow.com/questions/37846180/validate-post-data-from-swagger-json-schema-in-node.

* cited by examiner

*Primary Examiner* — Aimee Li
*Assistant Examiner* — An-An Ngoc Nguyen
(74) *Attorney, Agent, or Firm* — Dority & Manning, P.A.

(57) ABSTRACT

The technology disclosed herein identifying a workflow file in a storage location associated with a trigger event responsive to detecting the trigger event, generating, using the identified workflow file, a new specification definition, storing, in a temporary service registry, the new specification definition, wherein the new specification definition is one of a plurality of temporary specification definitions in the temporary service registry, and identifying from the list of specification definitions the one or more specification definitions based on a parameter of a request responsive to receiving the request for one or more specification definitions of a list of specification definitions. The list of specification definitions including the plurality of temporary specification definitions in the temporary service registry and a plurality of predefined specification definitions in a remote service registry.

20 Claims, 5 Drawing Sheets

200

Responsive to detecting a trigger event, identify a workflow file in a storage location associated with the trigger event.

210

Generate, using the identified workflow file, a new specification definition.

220

Store, in a temporary service registry, the new specification definition, wherein the new specification definition is one of a plurality of temporary specification definitions in the temporary service registry.

230

Responsive to receiving a request for one or more specification definitions of a list of specification definitions, identify from the list of specification definitions the one or more specification definitions based on a parameter of the request, wherein the list of specification definitions comprises the plurality of temporary specification definitions in the temporary service registry and a plurality of predefined specification definitions in a remote service registry.

240

Provide the one or more specification definitions to a user.

PROCESSING DEVICE

WORKSPACE
MONITORING MODULE
310

SPECIFICATION
DEFINITION
GENERATION
MODULE
320

REGISTRY
REGISTRATION
MODULE
330

SPECIFICATION DEFINITION
MANAGEMENT MODULE
340

MEMORY

TEMPORARY SERVICE
REGISTRY 360

Temporary Specification
Definition(s)

MEMORY

SERVICE REGISTRY 380

Predefined Specification
Definition(s)

Figure 4:
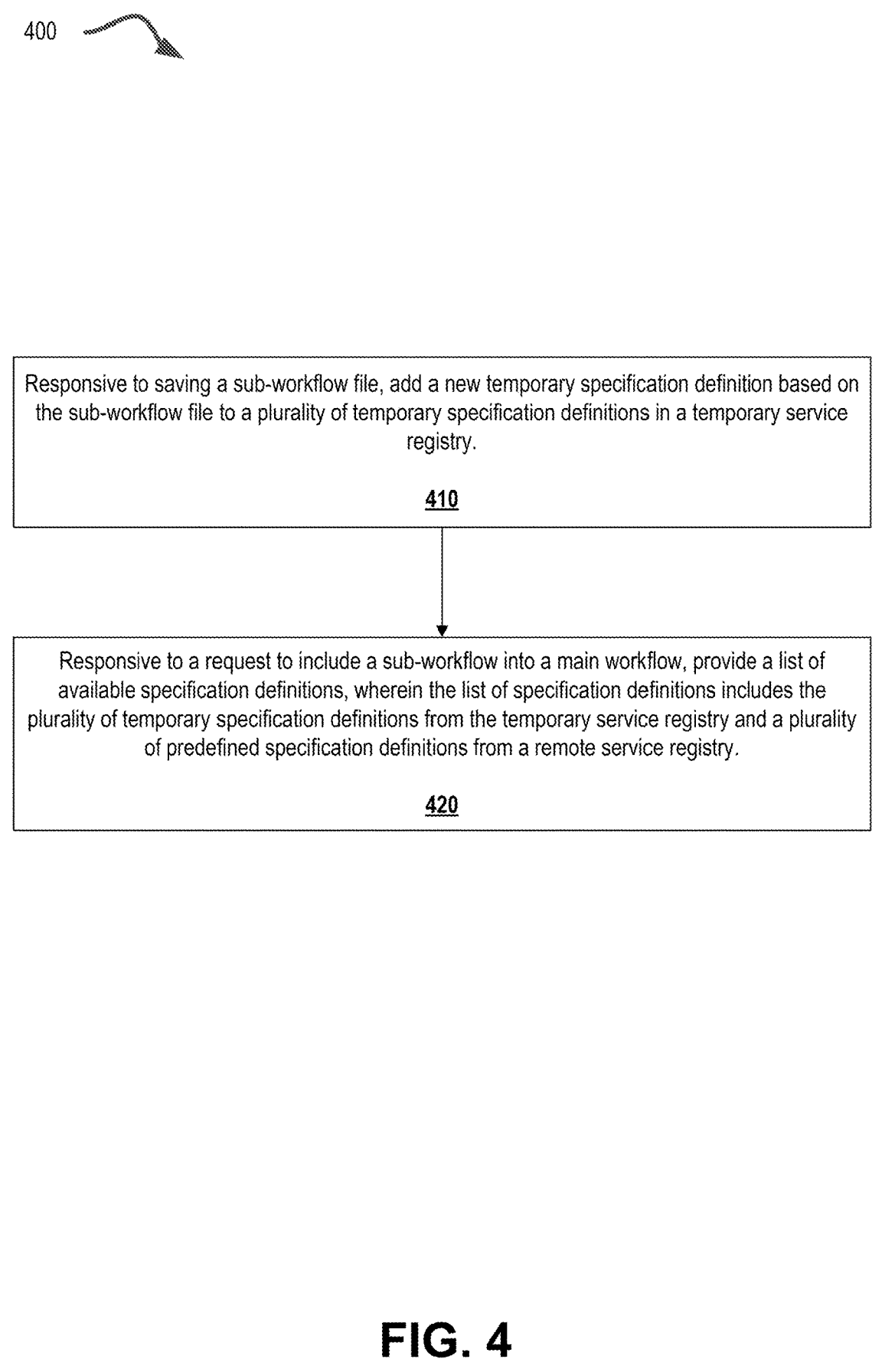

400

Responsive to saving a sub-workflow file, add a new temporary specification definition based on the sub-workflow file to a plurality of temporary specification definitions in a temporary service registry.

410

Responsive to a request to include a sub-workflow into a main workflow, provide a list of available specification definitions, wherein the list of specification definitions includes the plurality of temporary specification definitions from the temporary service registry and a plurality of predefined specification definitions from a remote service registry.

DYNAMIC GENERATION OF LOCAL SPECIFICATION DEFINITIONS FOR COMPOSITION OF WORKFLOW MICROSERVICES

TECHNICAL FIELD

The present disclosure is generally related to computer systems, and more particularly, to dynamic composition of workflow microservices.

BACKGROUND

Microservices are processes, such as instances of executable software modules, which handle responses for client requests. For example, a client sends a request and a microservice can generate a response to that request. Utilization of microservices allows for complex applications to be broken down into relatively simple and independent processes, which produces highly decoupled systems.

BRIEF DESCRIPTION OF THE DRAWINGS

The present disclosure is illustrated by way of example, and not by way of limitation, and can be more fully understood with reference to the following detailed description when considered in connection with the figures in which:

FIG. 2 depicts a flow diagram of an example method for dynamic composition of workflow microservices, in accordance with one or more aspects of the present disclosure;

FIG. 4 depicts a flow diagram of an example method for dynamic composition of workflow microservices, in accordance with one or more aspects of the present disclosure.

DETAILED DESCRIPTION

Figure 1:
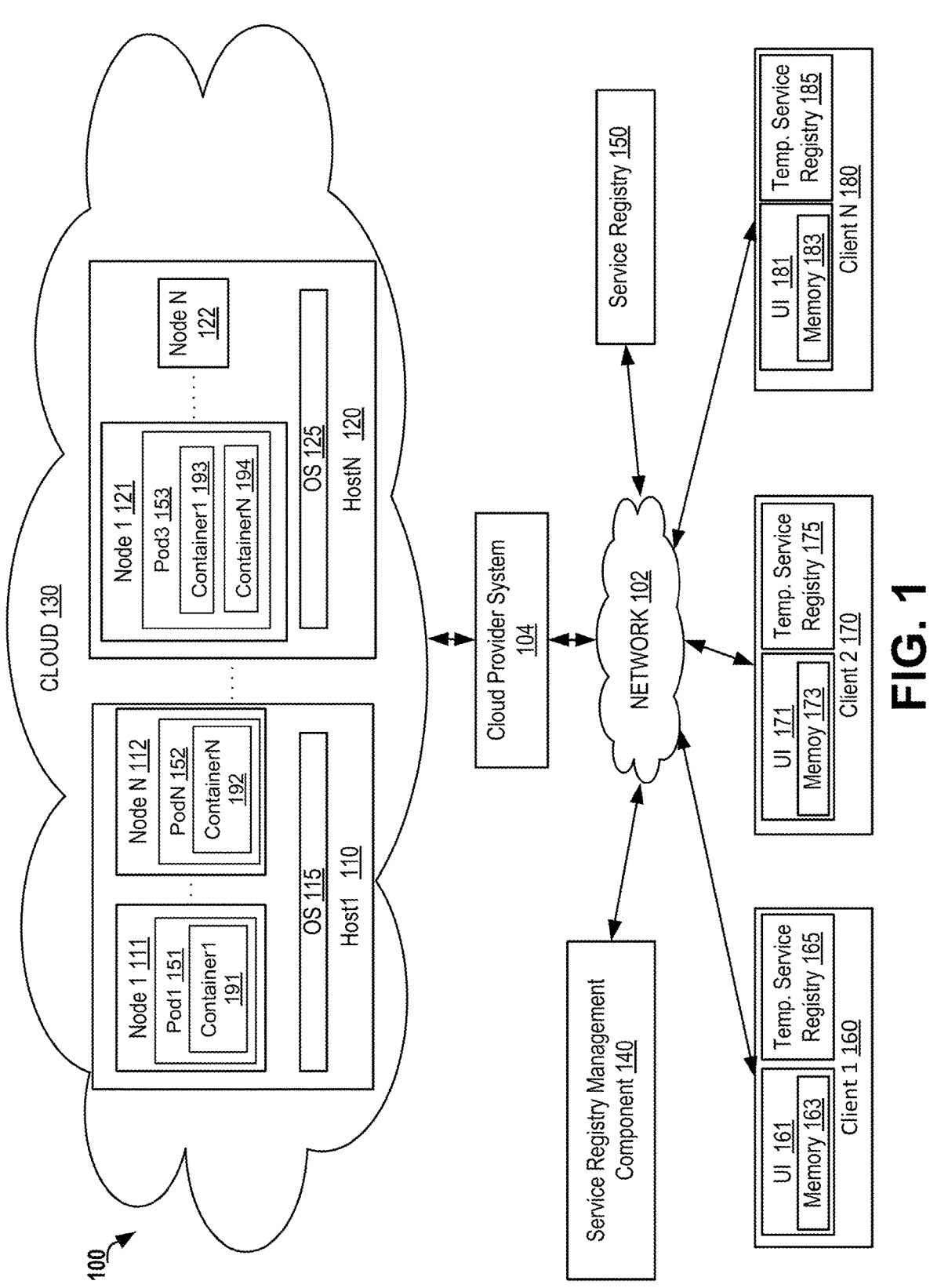
FIG. 1 depicts a high-level component diagram of an example computer system architecture, in accordance with one or more aspects of the present disclosure.

Described herein are methods and systems for dynamic composition of workflow microservices. Workflows have been widely accepted as an important component of microservice composition, utilized to orchestrate and choreograph microservices in an effective and efficient manner. Workflow file, such as a serverless workflow file, is an open-source specification that enables users to define a workflow running serverless functions using a standard domain-specific language (DSL) (e.g., JavaScript Object Notation (JSON) or Yet Another Markup Language (YAML)).

Build automation tool executes a program (e.g., a Java program) that builds the completed workflow file and generates a workflow (e.g., a Java workflow) microservice using a specification, such as a serverless specification. Examples of specifications include OpenAPI, AsyncAPI, GraphQL, gRPC, etc. Specifications describe remote services that workflows may make requests (remote calls). These specifications can expose services implemented in different technologies that can be called using open formats such as JSON and YAML (i.e., it allows both humans and computers to discover and understand the capabilities of the service without access to source code, documentation, or through network traffic inspection). When properly defined, a consumer can interact with the remote service (e.g., microservice) with a minimal amount of implementation logic.

Specification definitions are used to map open API definitions for a given microservice to the running instance of such microservice. Specification definitions, which are mapped to running instances of a workflow microservice, are registered (or deployed) to a service registry, such as microservice service registry. The service registry is a database used to manage available instances of each specification definition. The service registry is updated each time a new version of the workflow is built and registered or removed (e.g., offline or unavailable). Registration of a specification definition requires that the specification definition be manually uploaded to a local and/or remote server hosting the service registry using an interface, such as RESTful API.

Since complex monolithic applications are broken down into several individual workflows (e.g., sub-workflows), a workflow (e.g., a main workflow) using a design pattern such as saga, may be used to manage data consistency across the sub-workflows. Saga is a sequence of transactions that updates each microservice and publishes a message or event to trigger the next transaction step. If a step fails, the saga executes compensating transactions that counteract the preceding transactions.

During composition of the main workflow, a main workflow file is created, and a user may consume one or more of the sub-workflows. Each sub-workflow may be consumed by querying the service registry for available instances of each specification definition. The user may, based on the available instances of each specification definition, include the specification definition associated with a sub-workflow in the main workflow. As previously noted, each time an update is made to a sub-workflow and/or a new sub-workflow is created, a new instances of the sub-workflow may be built and registered to the service registry (e.g., manually added or updated on the service registry). Consequently, composition of the main workflow is either delayed or halted, until each sub-workflow, intended to be consumed, is registered. Thus, the development of the sub-workflows and main workflow is reduced to a waterfall software development approach.

Aspects of the disclosure address the above-described and other deficiencies by providing systems and methods for deploying, to a temporary service registry, workflow descriptors of sub-workflows for immediate consumption by a main workflow. In an embodiment, a user (e.g., a software developer) may develop, via a workflow editor, a sub-workflow. The sub-workflow may be stored in a repository (or data store) and monitored for changes. A workflow descriptor is generated based on changes to a sub-workflow in the repository and registered to the temporary service registry. In an embodiment, during development of a main workflow, the user, via the workflow editor, may decide to include a sub-workflow into the main workflow. All available sub-workflow descriptors may be queried from both of a preestablished service registry (e.g., service registry) and the temporary service registry and provided to the user via the workflow editor.

Therefore, the systems and methods described herein implement a technology that provides immediate availability of new or updated sub-workflows to the main workflow more efficiently by eliminating the need to build, generate, and deploy workflow descriptors of the new or updated sub-workflows to the preestablished service registry. Various aspects of the above referenced methods and systems are described in detail herein below by way of examples, rather than by way of limitations.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as OpenShift® or Kubernetes®. The PaaS system provides resources and services (e.g., microservices) for the development and execution of applications owned or managed by multiple users. A PaaS system provides a platform and environment that allow users to build applications and microservices in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 may include a cloud-computing environment 130 (also referred to herein as a cloud) that includes computing nodes 111, 112, 121, 122 to execute applications and/or processes (e.g., services, microservices, etc.) associated with the applications. A "computing node" providing computing functionality may provide the execution environment for an application of the PaaS system. In some implementations, the "computing node" may refer to a container or virtual machine (VM) that is hosted on a physical machine, such as host 1 110 through host N 120, implemented as part of the cloud 130. In some implementations, the host machines 110, 120 can be located in a data center. For example, both computing nodes 111 and 112 can be hosted on the same physical machine 110 in cloud 130 provided by cloud provider 104. In other implementations, different processes of the same application can be deployed to computing node N 112 and computing node 1 121 with each node being hosted by different physical machines 110 and 120 and respectively located in disparate geographic locations and within different local networks. In some implementations, an environment other than a container or VM may be used to execute functionality of the PaaS system applications. When computing nodes 111, 112, 121, 122 are implemented as containers or VMs, they may each be executed by respective operating systems (OSs) 115, 125 on each respective host machine 110, 120.

In some implementations, the host machines 110, 120 may be located in the same data center while in other implementations, the host machines 110, 120 can be located in different data centers in remote physical locations from each other. Users can interact with applications or their constituent services and microservices executing on the cloud-based computing nodes 111, 112, 121, 122 using client computer systems, such as clients 160, 170 and 180, via corresponding user interfaces (e.g., web browser applications) 161, 171 and 181. In other implementations, the applications or their constituent components (e.g., microservices) may be hosted directly on hosts 1 through N 110, 120 without the use of VMs (e.g., a "bare metal" implementation), and in such an implementation, the hosts themselves are referred to as "computing nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

The network architecture 100 may include a service registry 150. The service registry 150 is a database used to manage a plurality of available predefined specification definitions and serves as a central location for users to consume predefined microservices. The service registry 150 is updated each time a new predefined workflow is built, and a corresponding predefined specification definition is registered. Each of the plurality of available predefined specification definitions is referenced by an identifier (e.g., name of the microservice associated with the specification definition or name of the specification definition).

The network architecture 100 may include a service registry management component 140 that implements dynamic composition of workflow microservices. A user may, via a user interface (e.g., UI 161) create a workflow file defining a sub-workflow (e.g., a sub-workflow file). The user may store the sub-workflow file in a workspace (not shown) that is persisted in memory of the UI (e.g., memory 163 of UI 161). Workspace may be a file or directory in which multiple sub-workflow files (or projects) are gathered.

The service registry management component 140 may monitor the workspace for a trigger event. The trigger events may be represented by the addition of a new sub-workflow file or the modification of an existing sub-workflow file. In some embodiments, monitoring the workspace for a trigger event may include traversing the workspace and analyzing each sub-workflow file of the workspace. The service registry management component 140 determines that a respective sub-workflow file satisfies one of the trigger events based on whether the sub-workflow file was recently modified and added.

Depending on the embodiment, additional trigger events may be considered, such as, removal of an existing sub-workflow file. To determine a sub-workflow file that satisfies the additional trigger events, the service registry management component 140 may maintain a temporary record of all existing sub-workflow files (e.g., identifiers of all existing sub-workflow file) within the workspace and compare it to the sub-workflow files in the workspace. Each sub-workflow file that is present in temporary record of the existing sub-workflow files but not present in the workspace is determined to satisfy the additional trigger event.

Upon detection of a trigger event, the service registry management component 140 retrieves from memory of the UI (e.g., memory 163 of UI 161) the sub-workflow file associated with trigger event (e.g., triggering sub-workflow file). The service registry management component 140 may generate, based on contents of the triggering sub-workflow file, a specification definition using a specification (e.g., OAS). In particular, the service registry management component 140 populates a template of the specification (e.g., OAS template) with content of the triggering sub-workflow file, such as an identifier of the sub-workflow and other metadata. The service registry management component 140 stores the populated specification template as the specification definition.

During generation of the specification, the service registry management component 140 may identify that the workflow associated with the triggering sub-workflow file is initiated via a non-event state. Thus, the service registry management component 140 may populate an endpoint of the specification definition with a request, such as POST. POST is a request method that requests that a web server (e.g., the microservice associated with the trigger workflow file) accept a payload enclosed in the body of the request message. The service registry management component 140 may format the payload defined by the user using a schema, such as a JSON schema.

The service registry management component 140 may register the generated specification definition to a temporary service registry (e.g., temporary service registry 165). In particular, the service registry management component 140 determines whether there is an previously created of the generated specification definition. If there is a previously created instance of the generated specification definition, the service registry management component 140 replaces the previously created of the generated specification definition with the generated specification definition in the temporary service registry. If there is no previously created instance of the generated specification definition, the service registry management component 140 stores the generated specification definition to the temporary service registry. The temporary service registry (e.g., temporary service registry 165, temporary service registry 175, or temporary service registry 185) is a database used to manage a plurality of available temporary specification definitions (e.g., specification definitions associated with sub-workflow files) for consumption of microservices. Depending on the embodiment, temporary specification definitions that satisfied the additional trigger event is removed from the temporary service registry. In some embodiments, the temporary service registry may be persisted in memory of the client (e.g., client 160, 170, and 180).

The user, via the user interface (e.g., UI 161), may alternate to and/or from creating the sub-workflow files and developing a workflow file defining a main workflow (e.g., main workflow file). The main workflow file may include one or more sub-workflows. In particular, the user may input text, either partial or full, indicating the one or more sub-workflows the user wishes to add to the main workflow file. The inputted text may generate a request with the text as a parameter. Depending on the embodiment, the user may indicate, via the user interface (e.g., UI 161), a request for a list of available specification definitions.

The service registry management component 140 may identify the request inputted, e.g., via the user interface (e.g., USI 161). Responsive to the request, the service registry management component 140 queries the plurality of available temporary specification definitions from the temporary service registry and the plurality of available predefined specification definitions from the service registry 150. The service registry management component 140 aggregates the plurality of available temporary specification definitions and the plurality of available predefined specification definitions into the list of available specification definitions. If the request did not include a parameter, the service registry management component 140 may provide the list of available specification definitions directly to the user.

If the request includes a parameter (e.g., text), the service registry management component 140 may filter the list of available specification definitions to those specification definitions of the list of available specification definitions that match the parameter. In particular, the service registry management component 140 compares an identifier of each specification definition of the list of available specification definitions with the parameter (e.g., partial or full text). The service registry management component 140 determines whether a partial or full text of the identifier of a respective specification definition of the list of available specification definitions matches the parameter. The service registry management component 140 provides a filtered list of available specification definitions including only the specification definitions of the list of available specification definitions that match to the user via the user interface. In some embodiments, as the text is inputted into the user interface, the service registry management component 140 filters the list of available specification definitions and provides the filtered list of available specification definitions to the user via the user interface.

Accordingly, the list of available specification definitions or filtered list of available specification definitions is provided to the user so that the user may choose one or more specification definitions to include in the main workflow file.

FIG. 2 depicts a flow diagram of an example method 200 for dynamic composition of workflow microservices, in accordance with one or more aspects of the present disclosure. Method 200 and each of its individual functions, routines, subroutines, or operations may be performed by one or more processors of the computing device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by an executable code of a host machine (e.g., host operating system or firmware), a virtual machine (e.g., guest operating system or virtual firmware), an external device (e.g., a PCI device), other executable code, or a combination thereof.

Method 200 may be performed by processing devices of a server device or a client device and may begin at block 210. At block 210, responsive to detecting a trigger event, the processing logic identifies a workflow file in a storage location associated with the trigger event. In some embodiments, the trigger event may include at least one of: an addition of a workflow file to the storage location or a modification of an existing workflow file in the storage location. As previously described, the trigger event is detected by monitoring a workspace persisted in memory of a UI which multiple stores workflow files (e.g., sub-workflow files).

At block 220, the processing logic generates, using the identified workflow file, a new specification definition. The new specification definitions may be generated by populating a specification template with an identification and metadata of the identified project file. The populated specification template is stored as the new specification definition.

At block 230, the processing logic stores, in a temporary service registry, the new specification definition. The new specification definition may be one of a plurality of temporary specification definitions in the temporary service registry. As previously described, the temporary service registry is a database used to manage the plurality of available temporary specification definitions for consumption of microservices.

In some embodiments, responsive to determining that a previously created of the specification definition exists, the processing logic replaces the previously created of the specification definition with the new specification definition in the temporary service registry. In some embodiments, responsive to determining that no previously created instances of the specification definition exist, the processing logic registers the new specification definition in the temporary service registry.

At block 240, responsive to receiving a request for one or more specification definitions of a list of specification definitions, the processing logic identifies from the list of specification definitions the one or more specification definitions based on a parameter of the request. In some embodiments, the request for the one or more specification definitions of the list of specification definitions may be generated by a user to include sub-workflows each associated with a specification definition of the one or more specification definitions into a main workflow file.

The parameter which is one of: a partial text or a full text associated with an identification of the one or more specification definitions may be used to filter the list of specification definitions to the one or more specification definitions. At block 250, the processing logic provides the one or more specification definitions to a user. As previously described, the list of specification definitions is filtered to the one or more specification definitions by comparing an identifier of each specification definition of the list of specification definitions (e.g., list of available specification definitions) with the parameter to determine whether a partial or full text of the identifier of a respective specification definition of the list of specification definitions matches the parameter.

The list of specification definitions may include the plurality of temporary specification definitions in the temporary service registry and a plurality of predefined specification definitions in a remote service registry. In some embodiments, list of specification definitions is generated by querying the temporary service registry for the plurality of temporary specification definitions and the remote service registry for the plurality of predefined specification definitions. The plurality of temporary specification definitions and the plurality of predefined specification definitions may be aggregated into the list of specification definitions.

Figure 3:
FIG. 3 depicts a block diagram of a computer system operating in accordance with one or more aspects of the present disclosure.

FIG. 3 depicts a block diagram of a computer system 300 operating in accordance with one or more aspects of the present disclosure. One or more of the components of FIG. 1 may execute on computer system 300. Computer system 300 may be the same or similar to network architecture 100 of FIG. 1, and may include one or more processors and one or more memory devices. In the example shown, computer system 300 may include a workspace monitoring module 310, a specification definition generation module 320, a registry registration module 330, and a specification definition management module 340.

The workspace monitoring module 310 may monitor a workspace for trigger events. The workspace may be a file or directory in which multiple sub-workflow files are stored. The workspace may be persisted in memory of the UI in which the user is creating the sub-workflow files. The trigger events may be the addition of a new sub-workflow file or the modification of an existing sub-workflow file. The workspace monitoring module 310 monitors for trigger events by traversing the workspace and analyzing each sub-workflow file of the workspace to determine if a respective sub-workflow file satisfies one of the trigger events (e.g., was recently modified and added). The workspace monitoring module 310 may notify the specification definition generation module 320 of sub-workflow file from the workspace associated with the trigger event (e.g., triggering sub-workflow file). In some embodiments, the workspace monitoring module 310 may transmit to the specification definition generation module 320 the triggering sub-workflow file.

The specification definition generation module 320 may generate a specification definition based on contents of the triggering sub-workflow file. In some embodiments, the specification definition generation module 320 may, in response to the notification from the workspace monitoring module 310, retrieve from the workspace the triggering sub-workflow file. In some embodiments, the specification definition generation module 320 may receive from the workspace monitoring module 310 the workspace the triggering sub-workflow file. The specification definition generation module 320 may generate the specification definition by populating a specification template with an identifier of the triggering sub-workflow file and other metadata of the triggering sub-workflow file. The specification definition generation module 320 may store the populated specification template as the specification definition. The specification definition generation module 320 may notify the registry registration module 330 of the generated specification definition for retrieval. In some embodiments, the specification definition generation module 320 may transmit to the registry registration module 330 the generated specification definition.

The registry registration module 330 may register the generated specification definition to a temporary service registry 360. The temporary service registry 360 is a database used to manage available temporary specification definitions for consumption of microservices.

The specification definition management module 340 may receive a request from a user for available specification definitions or a subset of the available specification definitions. Responsive to the request, the specification definition management module 340 queries the temporary service registry 360 for available temporary specification definitions and a service registry 380 for available predefined specification definitions. The specification definition management module 340 aggregates the available temporary specification definitions and the available predefined specification definitions into available specification definitions.

The specification definition management module 340 may determine that a request for available specification definitions was received by determining that the request did not contain a text parameter. Accordingly, the specification definition management module 340 provides the available specification definitions to the user via the user interface.

The specification definition management module 340 may determine that a request for a subset of the available specification definitions was received by determining that the request contained a text parameter. The specification definition management module 340 identify from the available specification definitions those specification definitions that satisfies the text parameter. The text parameter may be a partial text or full text that refers to one or more specification definitions. The specification definition management module 340 compares an identifier of each specification definition of the available specification definitions with the text parameter (e.g., partial or full). The specification definition management module 340 determines whether a partial or full text of the identifier of a respective specification definition of the available specification definitions matches the text parameter. Accordingly, the specification definition management module 340 provides the subset of the available specification definitions including only the specification definitions that satisfied the text parameter to the user via the user interface.

FIG. 4 depicts a flow diagram of an example method 400 for dynamic composition of workflow microservices, in accordance with one or more aspects of the present disclosure. Method 400 and each of its individual functions, routines, subroutines, or operations may be performed by one or more processors of the computing device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, responsive to saving a sub-workflow file, the processing logic adds a new temporary specification definition based on the sub-workflow file to a plurality of temporary specification definitions in a temporary service registry. As previously described, saving the sub-workflow file to causes a trigger event in a workspace in which the sub-workflow file is saved. The trigger event causes the processing logic to add the new temporary specification definition based on the sub-workflow file to the plurality of temporary specification definitions in the temporary service registry.

The new temporary specification definition may be added in the temporary service registry by populating a specification template with an identification and metadata of the sub-workflow file. As previously described, the temporary service registry is a database used to manage the plurality of available temporary specification definitions for consumption of microservices. The populated specification template is saved as the new temporary specification definition. Responsive to determining that a previously created of the new specification definition exists, the processing logic replaces the previously created of the new specification definition with the new specification definition in the temporary service registry. Responsive to determining that no previously created instances of the new specification definition exist, the processing logic registers the new specification definition to the temporary service registry.

At block 420, responsive to a request to include a sub-workflow into a main workflow, the processing logic provides a list of available specification definitions. The list of specification definitions may include the plurality of temporary specification definitions from the temporary service registry and a plurality of predefined specification definitions from a remote service registry. As previously described, the list of specification definitions is generated by querying the temporary service registry for the plurality of temporary specification definitions and the remote service registry for the plurality of predefined specification definitions. The plurality of temporary specification definitions and the plurality of predefined specification definitions may be aggregated into the list of specification definitions.

In some embodiments, the list of specification definitions provided may be filtered based on a parameter of the request. The parameter may be one of: a partial text or a full text associated with an identification of the one or more specification definitions. As previously described, the list of specification definitions is filtered by comparing an identifier of each specification definition of the list of specification definitions (e.g., list of available specification definitions) with the parameter to determine whether a partial or full text of the identifier of a respective specification definition of the list of specification definitions matches the parameter.

Figure 5:
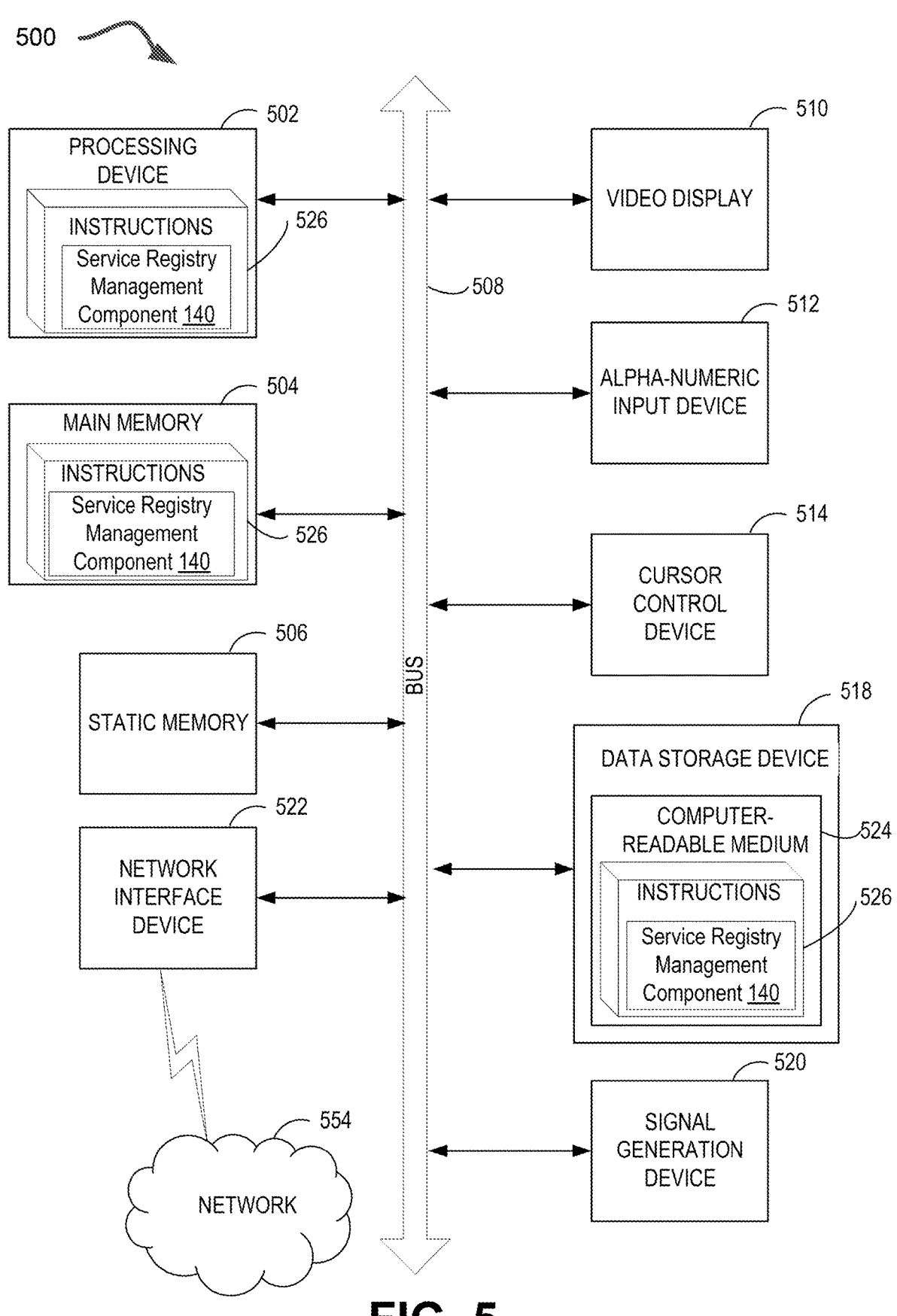
FIG. 5 depicts a block diagram of an example computer system operating in accordance with one or more aspects of the present disclosure.

FIG. 5 depicts a block diagram of a computer system operating in accordance with one or more aspects of the present disclosure. In various illustrative examples, computer system 500 may correspond to network architecture 100 of FIG. 1. Computer system 500 may be included within a data center that supports virtualization. Virtualization within a data center result in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 200 and 300.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

responsive to detecting a trigger event associated with a sub-workflow file, identifying, by a computing system comprising one or more processor devices, the sub-workflow file in a storage location associated with the trigger event, wherein the sub-workflow file is associated with a workflow microservice;

generating, using the sub-workflow file, a new specification definition that is configured to map open API definitions for the workflow microservice;

storing, in a temporary service registry local to the computing system, the new specification definition, wherein the new specification definition is one of a plurality of temporary specification definitions in the temporary service registry; and responsive to receiving a request that requests a plurality of specification definitions of a list of specification definitions from a remote service registry, identifying, from the list of specification definitions, the plurality of specification definitions, wherein the plurality of specification definitions comprises:

one or more of the plurality of temporary specification definitions in the temporary service registry local to the computing system, the one or more of the plurality of temporary specification definitions comprising the new specification definition;

one or more of a plurality of predefined specification definitions in the remote service registry; and building the workflow microservice using the one or more of the plurality of temporary specification definitions, the one or more of the plurality of predefined specification definitions, and the sub-workflow file.

2. The method of claim 1, further comprising:

providing the plurality of specification definitions to a requestor initiating the request.

3. The method of claim 1, wherein the request for the plurality of specification definitions indicates to include sub-workflows associated with a specification definition of the plurality of specification definitions into a main workflow file.

4. The method of claim 1, wherein the trigger event includes at least one of: an addition of a workflow file to the storage location or a modification of an existing workflow file in the storage location.

5. The method of claim 1, wherein generating, using the sub-workflow file, the new specification definition comprises populating a specification template with an identification and metadata of the sub-workflow file.

6. The method of claim 1, wherein storing, in the temporary service registry local to the computing system, the new specification definition comprises:

responsive to determining that a previously created instance of the specification definition exists, replacing the previously created instance of the specification definition with the new specification definition in the temporary service registry.

7. The method of claim 1, wherein storing, in the temporary service registry local to the computing system, the new specification definition comprises:

responsive to determining that no previously created instances of the new specification definition exist, registering the new specification definition in the temporary service registry.

8. The method of claim 1, wherein identifying from the list of specification definitions the plurality of specification definitions comprises:

querying the temporary service registry for the plurality of temporary specification definitions;

querying the remote service registry for the plurality of predefined specification definitions;

aggregating the plurality of temporary specification definitions and the plurality of predefined specification definitions into the list of specification definitions; and filtering the plurality of specification definitions from the list of specification definitions.

9. The method of claim 1, wherein identifying, from the list of specification definitions, the plurality of specification definitions comprises:

identifying, from the list of specification definitions, the plurality of specification definitions based on a parameter of the request, wherein the parameter is one of: a partial text or a full text associated with an identification of the one or more specification definitions.

10. A system comprising:

a memory;

a processing device operatively coupled to the memory, the processing device to:

responsive to detecting a trigger event associated with a sub-workflow file, identify the sub-workflow file in a storage location associated with the trigger event, wherein the sub-workflow file is associated with a workflow microservice;

generate, using the sub-workflow file, a new specification definition that is configured to map open API definitions for the workflow microservice;

store, in a temporary service registry local to the system, the new specification definition, wherein the new specification definition is one of a plurality of temporary specification definitions in the temporary service registry; and responsive to receiving a request that requests a plurality of specification definitions of a list of specification definitions from a remote service registry, identify, from the list of specification definitions, the plurality of specification definitions, wherein the plurality of specification definitions comprises:

one or more of the plurality of temporary specification definitions in the temporary service registry local to the system, the one or more of the plurality of temporary specification definitions comprising the new specification definition; and one or more of a plurality of predefined specification definitions in the remote service registry; and build the workflow microservice using the one or more of the plurality of temporary specification definitions, the one or more of the plurality of predefined specification definitions, and the sub-workflow file.

11. The system of claim 10, wherein the processing device is further caused to:

provide the plurality of specification definitions to a requestor initiating the request.

12. The system of claim 10, wherein the request for the plurality of specification definitions indicates to include sub-workflows each associated with a specification definition of the plurality of specification definitions into a main workflow file.

13. The system of claim 10, wherein the trigger event includes at least one of: an addition of a workflow file to the storage location or a modification of an existing workflow file in the storage location.

14. The system of claim 10, wherein generating, using the sub-workflow file, the new specification definition comprises populating a specification template with an identification and metadata of the sub-workflow file.

15. The system of claim 10, wherein storing, in the temporary service registry local to the system, the new specification definition comprises:

responsive to determining that a previously created instance of the specification definition exists, replacing the previously created instance of the specification definition with the new specification definition in the temporary service registry.

16. The system of claim 10, wherein storing, in the temporary service registry local to the system, the new specification definition comprises:

responsive to determining that no previously created instances of the new specification definition exist, registering the new specification definition in the temporary service registry.

17. The system of claim 10, wherein identifying from the list of specification definitions the plurality of specification definitions comprises:

querying the temporary service registry for the plurality of temporary specification definitions;

querying the remote service registry for the plurality of predefined specification definitions;

aggregating the plurality of temporary specification definitions and the plurality of predefined specification definitions into the list of specification definitions; and filtering the plurality of specification definitions from the list of specification definitions.

18. A non-transitory computer readable storage medium including instructions that, when executed by a processing device of a computing system, cause the processing device to:

responsive to saving a sub-workflow file associated with a workflow microservice, add a new temporary specification definition based on the sub-workflow file to a plurality of temporary specification definitions in a temporary service registry local to the computing system, wherein the new temporary specification definition is configured to map open API definitions for the workflow microservice; and responsive to a request to include a sub-workflow into a main workflow, provide a list of available specification definitions, wherein the request requests the list of available specification definitions from a remote service registry, wherein the list of specification definitions includes one or more of the plurality of temporary specification definitions from the temporary service registry local to the computing system and one or more of a plurality of predefined specification definitions from the remote service registry; and build the workflow microservice using the one or more of the plurality of temporary specification definitions from the temporary service registry, the one or more of the plurality of predefined specification definitions from the remote service registry, and the sub-workflow file.

19. The non-transitory computer readable storage medium of claim 18, wherein adding the new temporary specification definition based on the sub-workflow file to the plurality of temporary specification definitions in the temporary service registry local to the computing system comprises:

populating a specification template with an identification and metadata of the sub-workflow file;

saving the populated specification template as the new temporary specification definition;

responsive to determining that a previously created instance of the new temporary specification definition exists, replacing the previously created instance of the new temporary specification definition with the new temporary specification definition in the temporary service registry; and responsive to determining that a previously created instance of the new temporary specification definition does not exist, registering the new temporary specification definition to the temporary service registry.

20. The non-transitory computer readable storage medium of claim 18, wherein the list of specification definitions is filtered based on a parameter of the request.

* * * * *